US005771041A

United States Patent [19]

Small

[11] Patent Number: 5,771,041
[45] Date of Patent: Jun. 23, 1998

[54] SYSTEM FOR PRODUCING DIRECTIONAL SOUND IN COMPUTER BASED VIRTUAL ENVIRONMENT

[75] Inventor: Ian S. Small, Cupertino, Calif.

[73] Assignee: Apple Computer, Inc., Cupertino, Calif.

[21] Appl. No.: 763,144

[22] Filed: Dec. 3, 1996

Related U.S. Application Data

[63] Continuation of Ser. No. 253,298, Jun. 3, 1994, abandoned.

[51] Int. Cl.⁶ ..................................................... G06F 3/16
[52] U.S. Cl. ............................................ 345/326; 345/978
[58] Field of Search ..................................... 395/355, 326, 395/978, 976, 327; 345/145; 434/115

[56] References Cited

U.S. PATENT DOCUMENTS

| | | | |
|---|---|---|---|
| 3,800,082 | 3/1974 | Fish | 434/116 X |
| 3,831,434 | 8/1974 | Greguss | 73/603 |
| 4,322,744 | 3/1982 | Stanton | 434/116 X |
| 4,768,086 | 8/1988 | Paist | 381/56 |
| 4,952,024 | 8/1990 | Gale | 359/477 |
| 5,186,629 | 2/1993 | Rohen | 434/116 X |
| 5,223,828 | 6/1993 | McKiel, Jr. | 340/825.19 |
| 5,287,102 | 2/1994 | McKiel, Jr. | 340/825.19 |
| 5,374,924 | 12/1994 | McKiel, Jr. | 340/825.19 |
| 5,467,401 | 11/1995 | Nagamitsu et al. | 381/63 |
| 5,469,511 | 11/1995 | Lewis et al. | 434/116 X |
| 5,513,129 | 4/1996 | Bolas et al. | 364/578 |

FOREIGN PATENT DOCUMENTS

| | | |
|---|---|---|
| 0479604A2 | 4/1992 | European Pat. Off. . |
| 0590966A2 | 4/1994 | European Pat. Off. . |

OTHER PUBLICATIONS

Cohen, Michael, "Integrating Graphic and Audio Windows", Presence, vol. 1, No. 4, Fall 1992, pp. 468–481.

*Primary Examiner*—Mark R. Powell
*Assistant Examiner*—Crescelle N. dela Torre
*Attorney, Agent, or Firm*—Burns, Doane, Swecker & Mathis, LLP

[57] ABSTRACT

In a system for describing directional sounds in virtual environments, a user creates a sound projection map that constitutes a two-dimensional array of sound intensities for each sound source associated with the virtual environment. At run-time, when a user selects a particular view for a scene in the environment, a hearing area corresponding to that view is calculated. The average intensity for each sound represented within the hearing area is determined from the array, to establish a level at which the sound is to be played. The sound associated with the sound source is then reproduced from a sound track at the determined level, to produce an output sound that creates a sense of place within the environment.

19 Claims, 5 Drawing Sheets

SYSTEM FOR PRODUCING DIRECTIONAL SOUND IN COMPUTER BASED VIRTUAL ENVIRONMENT

This application is a continuation of application Ser. No. 08/253,298, filed Jun. 3, 1994 now abandoned.

BACKGROUND OF THE INVENTION

The present invention is directed to the production of sounds in computergenerated environments, and more particularly to a system which provides a large degree of flexibility in describing directional sound while at the same time is computationally inexpensive to implement.

With the increasing availability of computer processing power at affordable prices, computer-based two- and three-dimensional environments are providing greater degrees of visual richness. Highly detailed images which occupy a large portion of the display screen can be provided to the user sufficiently fast to present a sense of realism. Hardware and software techniques enable the user to look around and move within both completely synthetic environments and digitized versions of real environments.

To provide a complete sense of place, sound is an extremely important component in the overall environment. Some high-end virtual reality systems incorporate sound into synthetic models of three-dimensional space. To do so, they typically employ dedicated hardware to perform sound mixing based on complex mathematical models of sound, and attempt to simulate reality as accurately as possible. These approaches rely upon three-dimensional models of space in which sound sources are placed. To illustrate, FIG. 1 depicts a top view of a room which can form an exemplary virtual reality environment. This room contains two sound sources, a television and a group of people sitting around a table. A virtual user is shown situated between the two sound sources, and oriented in the direction indicated by the arrow. At run-time, i.e. when the environment is presented to the user, the sound propagation from each of the two sources is mathematically determined based on known models, and the resulting sound is generated. Thus, in the example of FIG. 1, the user would hear sounds from both of the sources. As the user turns towards one source, for example the table, the sound from the other source might diminish in accordance with the propagation model.

This prior art approach is designed to simulate reality, and can be computationally expensive, particularly where multiple sound sources are involved. In many situations, such as consumer-oriented multimedia products, absolute realism is not necessarily of highest priority. In some cases it may be desirable to deliberately distort sound in order to produce a desired effect or to focus the user's attention. The prior art approach depicted in FIG. 1 is not readily suited to the creation of non-realistic sound sources which provide these effects. For example, when the user shifts his or her view towards the table to listen to the conversation taking place there, it may be desirable to totally block the sounds coming from the television. To do so, it may be necessary to decrease the overall sound output from the television. However, by taking this approach, the sound associated with other locations and views of the user will also be affected, i.e. the sound from the television will be reduced in all views. This is due to the fact that the conventional approach permits only global control of sounds, based on a strict set of rules. It does not allow sounds to be controlled at localized levels. For example, it does not permit the existence of a sound source having a U-shaped propagation pattern such that, if the user is situated at a particular location and orientation, no sounds from that source will be heard, but if the user moves slightly or changes orientation slightly, the sounds can be heard.

Accordingly, it is desirable to provide a system for producing directional sound in virtual environments which permits sound levels to be controlled on a local basis and thereby frees the environment developer from strict rules of sound propagation. Further along these lines, it is desirable to provide such a system which is simple to use while at the same time is computationally inexpensive to implement.

Brief Statement of the Invention

In accordance with the present invention, these objectives are accomplished by means of a system in which sound intensities for each of the sound sources in a given scene are described by means of a user-generated two-dimensional array or sound projection map. In a preferred implementation which contributes to the simplicity of the invention, the sound map is created by "painting" sound levels on a projected image of the environment. For example, different colors can be used to represent different sound sources, and within each color different intensities or hues can describe different sound intensities, i.e. volume levels.

At run-time, when the user selects a particular view for a visual scene in the computer-generated environment, a hearing area corresponding to that view is calculated. Basically, the hearing area determines the portion of the environment from which sound is sampled. The average intensity for each sound represented within the hearing area is determined, for example by integrating the intensities over the hearing area and averaging them. This result provides a level at which a stored sound is to be played. After the sound levels for each of the sounds in the hearing area has been established, the various sound sources are reproduced and mixed, to provide the desired sound output. As the user looks around the virtual environment, and thereby changes the view, the hearing area changes correspondingly. As a result, the sound levels from the various sound sources change to provide a dynamic sense of place within the environment.

Further features of the invention, as well as the advantages offered thereby, are described in detail hereinafter with reference to specific embodiments illustrated in the accompanying drawings.

DETAILED DESCRIPTION

Generally speaking, the present invention is directed to a system for producing sounds that are appropriate to various user viewpoints in a virtual environment. These sounds can be real, naturally-occurring sounds, or synthesized sounds, or some combination of both. The actual sounds that are utilized, as well as the specific techniques for generating or reproducing the sounds, do not form part of the invention itself. Rather, the invention is more generally concerned with the determination of which sounds are to be produced for any given view within a virtual environment, as well as the volume level at which each such sound is to be produced.

Computer-generated virtual reality environments are based on the concept that imagery visible from a point in space can be projected onto a geometric surface, such as a plane. In some implementations, all of the images that are visible in any direction from a point are projected onto a continuous surface, and that surface is sampled to determine the image from a particular viewpoint during run-time. For example, the world around a person can be painted or otherwise presented on the inside of a sphere. If the person is located at the center of the sphere, it is possible to see the appropriate imagery for any view direction. Other geometric surfaces are also suitable for this purpose. For example, the imagery can be projected onto the inside of a cube. Likewise, the imagery can be projected onto the inside of a cylinder, with appropriate limits being set as to how far up or down the person is allowed to look. If the cylinder is unrolled so that it is flat, the imagery is similar to that of a 360° panoramic photograph.

In accordance with the present invention, a flattened projection of the imagery around a user is employed to describe directional sound associated with that imagery. In essence, the projection is used to create a sound map that describes the directional propagation of sounds within the environment. Any flattened projection can be employed for this purpose. To illustrate the principals of the present invention herein, a flattened cylindrical projection of the type described above will be used as an example.

Figure 1:
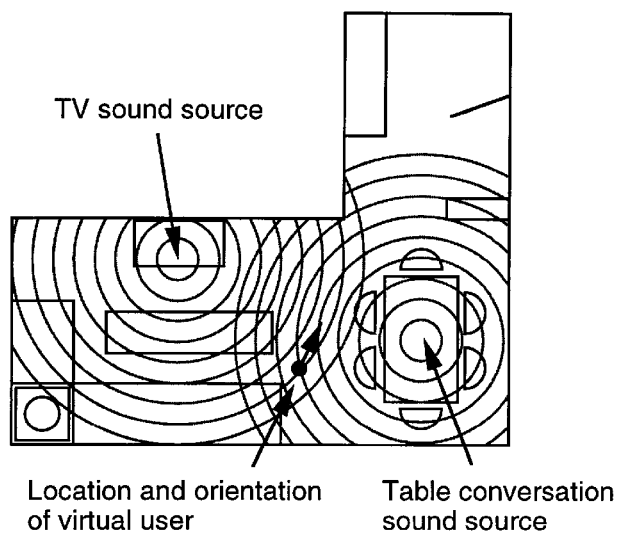
FIG. 1 is a top plan view of a virtual environment, depicting a prior art approach to the computation of sound at a particular location within the environment.
Figure 2:
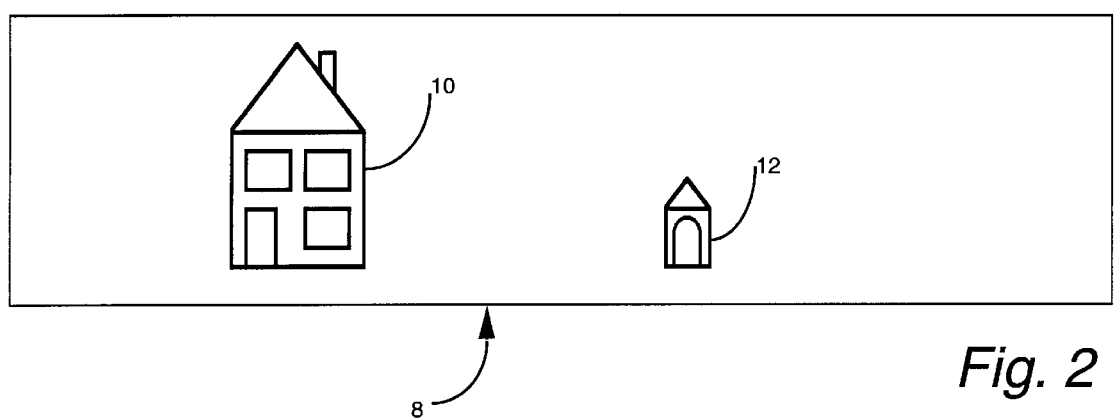
FIG. 2 is a flattened projection of an exemplary scene for a virtual environment.

FIG. 2 illustrates a panoramic image 8 of a simple environment containing two structures that constitute sound sources, namely a residential house 10 and a doghouse 12. For purposes of this example, it is assumed that the sounds emanating from the house 10 can be heard regardless of the direction the viewer is looking. Of course, the sounds are loudest when the viewer is looking directly at the house. Conversely, the sounds from the doghouse can only be heard when the viewer focusses his or her attention in that direction.

Figure 3:
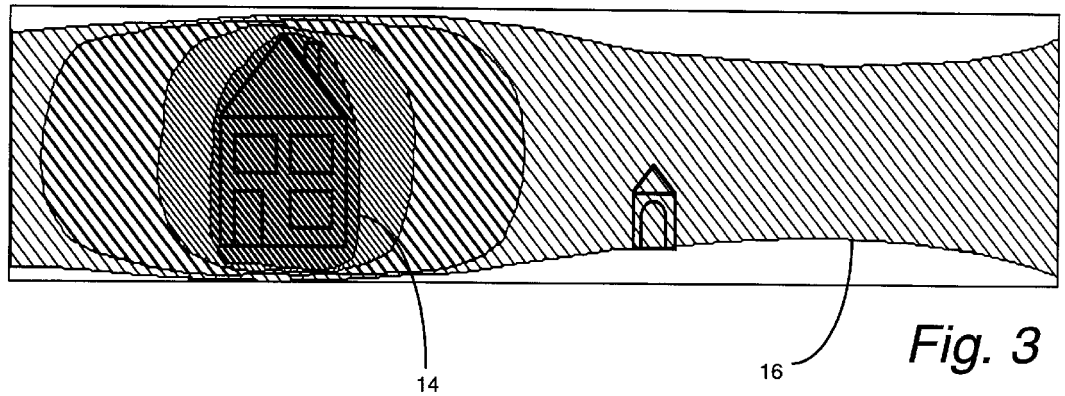
FIG. 3 is a sound projection map for one of the sound sources in the scene of FIG. 2.

This image is employed to create a sound map that describes the propagation of sound from each of the two sources. Referring to FIG. 3, the sound from the house 10 is represented in the scene by means of shading. The different sound levels associated with this sound source are depicted by different intensities of shading. Thus, the shading 14 in the immediate vicinity of the house is densest, and becomes less dense at various distances from the house. The lowest density shading 16 stretches entirely across the scene, to represent the fact that the sound can be heard from any viewing direction within the environment. In essence, therefore, the shading in the sound map of FIG. 3 is a two-dimensional array of sound intensities associated with the house 10.

Figure 4:
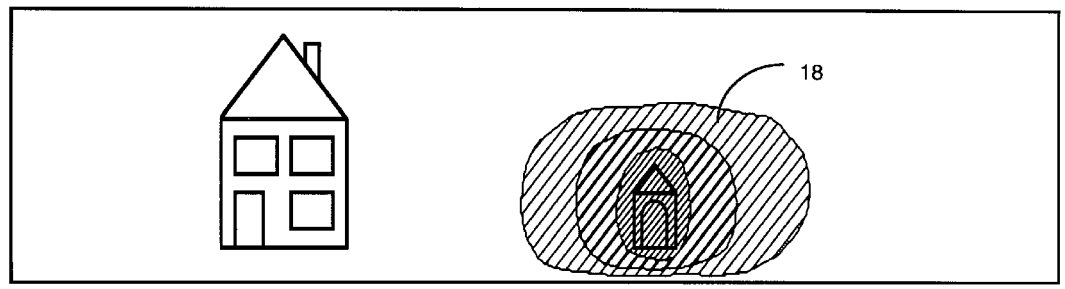
FIG. 4 is a sound projection map for the other sound source in the scene of FIG. 2.
Figure 5:
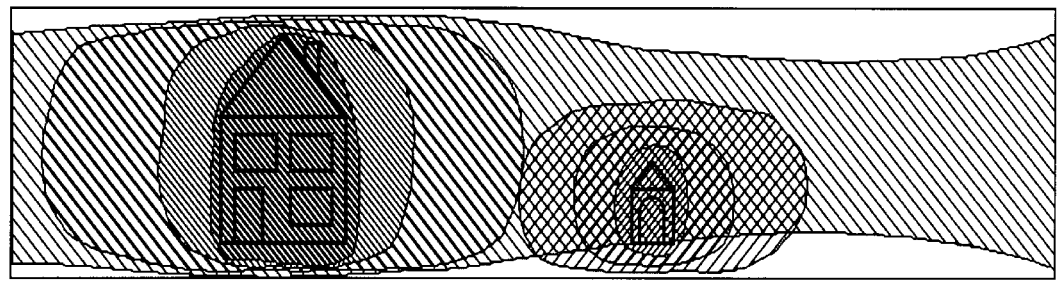
FIG. 5 is a composite sound projection map.

In a similar manner, the sound emanating from the doghouse 12 can be represented with appropriate shading 18, as shown in the sound map of FIG. 4. Again, the shading is most dense in the immediate vicinity of the doghouse, and decreases in intensity at distances away from the doghouse. FIG. 5 is a composite map representing the sound intensities from each of the two sound sources.

In the illustrated example, the various sound intensities are represented by means of different shading patterns. In a preferred implementation of the invention, each of the different sounds is represented by a different color or greyscale value. Thus, for example, the sounds emanating from the house 10 can be represented by the color red, and those from the doghouse 12 by the color blue. Within each color, a higher intensity, or deeper hue, can represent the highest sound level, and lower densities represent lower sound levels. These colors can be applied to the imagery using any suitable conventional color paint program. For example, the image might be a composite of several layers, and one or more of the layers can be used for purposes of the "painted" sounds that constitute the sound map.

In the implementation of the invention, a suitable soundtrack is established for each sound source. In the example of FIG. 2, the soundtrack for the residential house 10 might contain voices of people and/or music from an entertainment system. The soundtrack associated with the doghouse 12 can be that of a barking dog or crying puppies, for example. For each sound source, the environment developer generates a sound intensity map, as depicted in FIGS. 3 and 4 for the two respective sound sources. One of the advantages of the present invention is the fact that each sound propagation pattern can have any arbitrary shape desired by the developer. For example, as shown in FIG. 5, the array associated with the house 10 overlaps that of the doghouse 12 so that, for certain views, the user can hear sounds from both sources. If desired, however, it is possible to design the respective patterns so that they do not overlap one another, and therefore only one sound can be heard at any given viewpoint. Further in this regard, the arrays can be discontiguous, so that sounds from a particular source can be heard in some views, but not heard in other, adjacent views. In other words, the sounds are not required to follow the normal rules of propagation.

Figure 6:
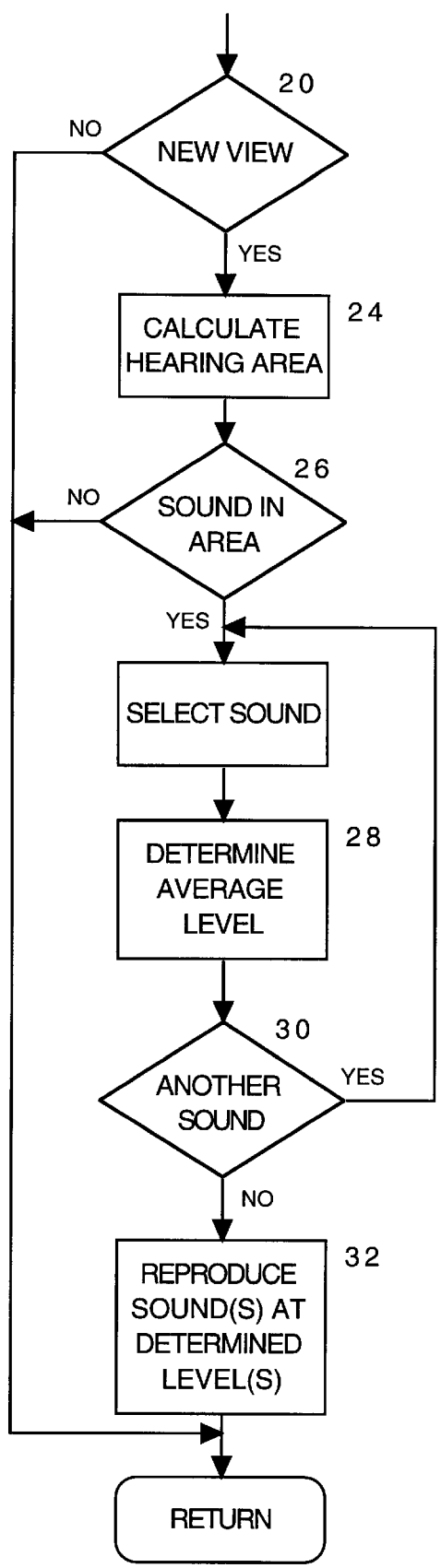
FIG. 6 is a flow chart of the procedure for producing sound at run-time.
Figure 7:
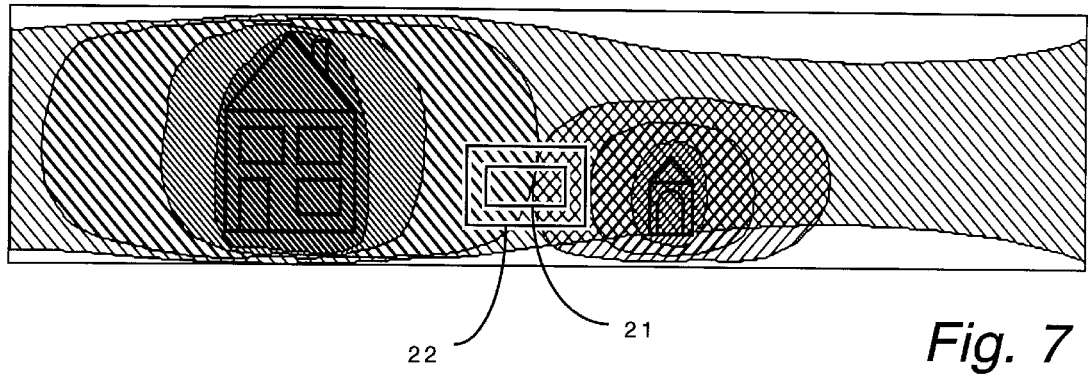
FIG. 7 is the composite sound projection map of FIG. 5 illustrating viewing and hearing areas.

Once the sound intensity maps have been generated for each of the sound sources, and a suitable soundtrack specified for each source, the sound can be produced on a real time basis within the virtual environment. The process carried out by the present invention at run-time is depicted in the flow chart of FIG. 6. In operation, the user designates a particular view for the environment (Step 20). For example, in the play of an adventure game, this may be done through the use of a joystick or other positioning device. Depending upon the particular implementation, the movement from one view to the next may be continuous over the area of the scene or it may occur in discrete steps. Referring to FIG. 7, the user's action causes a viewing area 21 to be established. In essence, the viewing area indicates the portion of the scene that is visible on the display screen for the computer. The viewing area need not have a rectangular shape, as depicted in FIG. 6. For example, if the virtual environment simulates a view through a telescope, the viewing area might be circular in shape.

Once the viewing area has been designated by the user, an associated hearing area 22 is calculated (Step 24). The hearing area designates the portion of the scene from which sound is to be sampled. The hearing area can have any arbitrary size relative to the viewing area. For example, the hearing area might be the same as the viewing area, although it is preferably larger than the viewing area, to take into account the fact that sound sources which are immediately off-screen can still be heard. A suitable hearing area might have dimensions which are fifteen percent larger than those of the viewing area. Similarly, the hearing area can have any arbitrary shape. For example, rather than being a rectangle is illustrated in FIG. 7, the hearing area might be circular or elliptical in shape. Its shape is independent of the shape of the viewing area.

Once the hearing area is established for the scene, a determination is made whether any sounds are represented in that area (Step 26). In other words the sound projection map is examined to determine whether it contains a color, or nonzero sound intensity value, within the hearing area. The intensity of each sound represented within the hearing area is processed to determine an average sound level (Step 28). For example, the sound intensity values represented in the sound map can be integrated over the hearing area and then averaged to provide the sound level. This process is separately carried out for each sound source (Step 30). Referring to the example of FIG. 7, the hearing area includes portions of the intensity patterns associated with each of the residential house 10 and the doghouse 12. Therefore, the respective intensity arrays for each of these two sound sources are integrated and averaged over the hearing area, to determine respective sound levels.

Once a sound level has been established for each audible sound, the sounds are reproduced from their respective soundtracks at the established levels (Step 32). Suitable conventional hardware and/or software techniques can be used to mix the various sounds at these levels and thereby produce a desired output sound.

Figure 8:
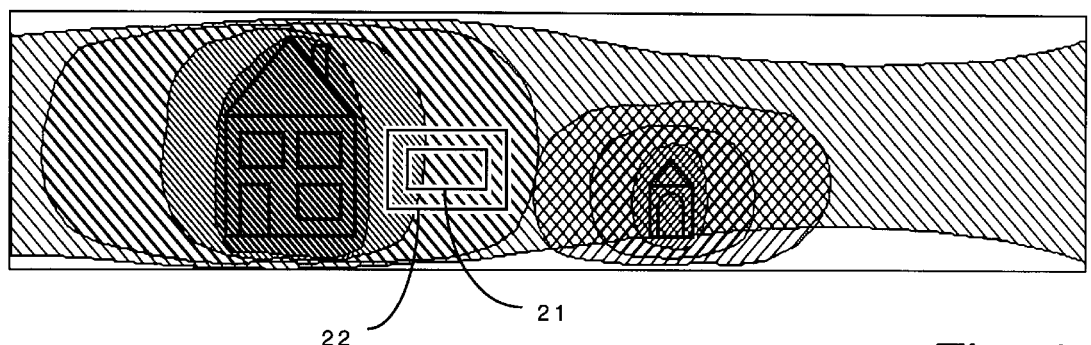
FIG. 8 is the composite sound projection map, illustrating the viewing and hearing areas in a different location.

As the user looks around the virtual environment, the location of the viewing area changes, and the hearing area moves with it. As a result, the sampled area on the sound map changes, to cause the sound levels of the various sound sources to change, and thereby present a sense of place for the user. Referring to FIG. 8, for example, the user has shifted the viewpoint to the left. The selection of a new view causes the process depicted in FIG. 6 to be carried out again. In the example of FIG. 8, the projected sound for the doghouse 12 is no longer encompassed within the hearing area, and so its sound level will be zero. Conversely, greater intensity sound from the house 10 is now sampled, so that the volume for that sound is correspondingly increased.

The intensity of the sound can have any desirable resolution. For example, in some environments, a resolution of one bit may be sufficient, i.e. the sound is either on or off for any given sample. In other situations, multiple levels of intensity may be desirable, as shown in FIGS. 3 and 4. In a similar manner, the spatial resolution of the sound can be arbitrarily chosen. For example, if extremely fine local control is desirable, the sound can be adjusted on a pixel-by-pixel basis. Alternatively, the sound map can have a much courser resolution than that of the scene imagery, since the two resolutions are independent of one another.

Further in this regard, the horizontal and vertical resolutions of the sound can be different from one another. For example, very fine resolution might be provided in the horizontal direction, but only course control in the vertical direction. In an extreme case, the sound gradient in the vertical direction might be zero, effectively resulting in vertical slices of sound across the width of the scene.

Figure 9:
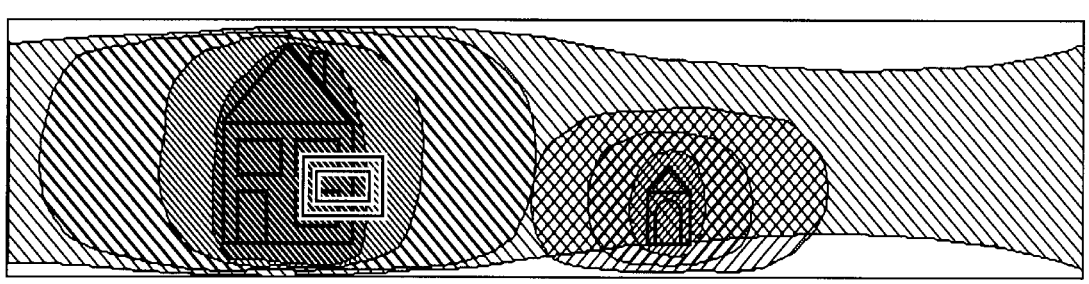
FIG. 9 is the composite sound projection map, illustrating the effect of zooming the viewing area in on one of the sound sources.

FIG. 9 represents a further example in which the user has zoomed in on the house, which effectively causes the size of the viewing area to be reduced, i.e. the image is magnified on the screen. The hearing area is also correspondingly reduced in size, and now encompasses primarily the most intense sound associated with the house. As a result, the volume of that sound is increased.

It is not necessary that only one soundtrack be associated with each sound source. Two or more digitized sounds can be associated with a particular source. The selection of the particular sound to reproduce at any given time can be random, or it can be made dependent on various criteria. For example, the sound may be chosen on the basis of the determined sound level. To illustrate, each of the windows within the house 10 might relate to a separate sound source, e.g. different conversations taking place in each of the different rooms of the house. When the average intensity of the sounds coming from the house is relatively low, due to the fact that the viewer's attention is focussed some distance away from the house, the soundtrack might comprise mumbled voices. However, as the viewer focusses in on one of the windows, and the average intensity rises above a threshold level, the soundtrack can switch to the specific conversation that is occurring in that room.

In another example, the sound emanating from various sources might be informational in nature. When the average intensity is low, the information can be very general, and designed to attract the viewer's attention to that source. For instance, if the virtual environment is a shopping mall, the sound coming from each store can be a repeating identification of the general types of products sold in that store. As the user focusses in on a particular store, the soundtrack can switch to a more specific description of those products, to provide the user with additional information.

Figure 10:
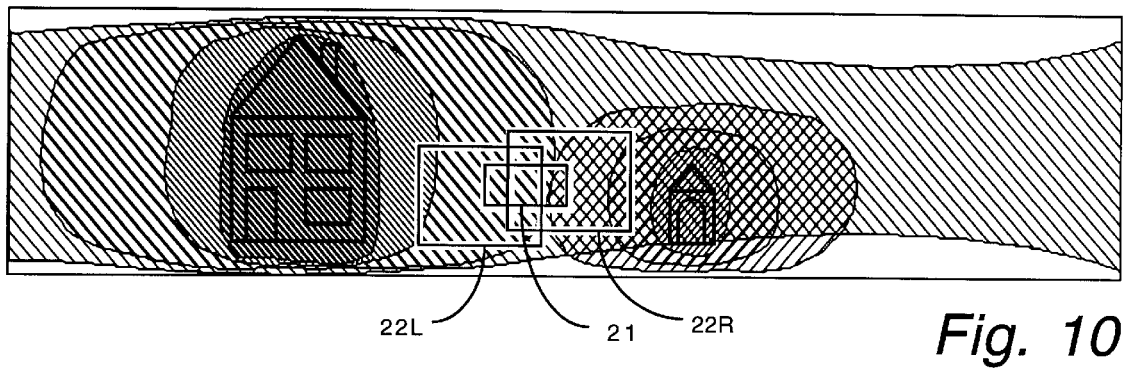
FIG. 10 is the composite sound projection map, illustrating multiple hearing areas for stereo sound.

As a further feature, multiple hearing areas can be associated with each viewing area. For example, as illustrated in FIG. 10, two hearing areas 22R and 22L can be established to produce stereo sound. These two hearing areas are horizontally off-set on either side of the viewing area 21, and respectively correspond to the right and left channels of the stereo sound. (For purposes of clarity in the figure, the two hearing areas 22L and 22R are illustrated as being vertically offset from one another. In actual practice, they will likely be horizontally aligned.) The intensities are separately processed for each of the two hearing areas, and used to control the volume of the stereo channel associated with each respective hearing area. In a similar manner, additional hearing areas can be employed for the production of quadraphonic sound or surround sound. In the case of surround sound, at least one of the sound sources is typically located behind the viewer. Therefore, one of the hearing areas is positioned 180° out of phase with the viewing area in the flattened projection of the scene.

Figure 11:
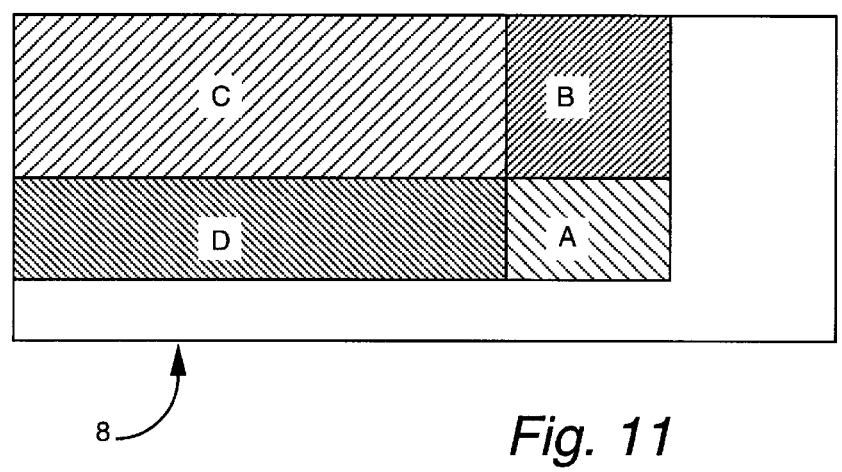
FIG. 11 is an illustrative example of a technique for determining the integrated intensity of an area within a scene.

From the foregoing, it can be appreciated that the computational run-time requirements for implementing the present invention are relatively simple, i.e. the integration and averaging of the sound intensity information within the hearing area. These requirements can be reduced even further through suitable preprocessing of the information contained in the sound map. For example, a known technique such as the summed area table can be employed to reduce the integration processing to three additions and a division operation. In this technique, an array is created in which each value in the array comprises the sum of integration of all cells above and to the left of the cell of interest. Each cell in the array might correspond to a pixel in the sound map, for example. The use of this technique in the implementation of the invention is explained with reference to FIG. 11. To integrate the values within a rectangular hearing area A, the stored value corresponding to the lower right corner of the area is retrieved. This value equals the sum of integration of all values in the areas A, B, C and D. From this retrieved value is subtracted the value for the upper right corner of the area, which represents the sum of integration of the values in the areas B and C. This first calculation produces an integration of all of the pixels in a strip from the left edge of the scene up to and including the hearing area, i.e. areas A and D. From this result is then subtracted the stored value corresponding to the lower left corner of the viewing area, which represents areas C and D. As a result, the value for the area C, above and to the left of the hearing area A, has been subtracted twice. Therefore, the stored value for the upper left corner of the hearing area, which represents the integration of the area C, is added back into the result. The final result is then divided by the area of the hearing area, to provide an average sound level.

From the foregoing, it can be seen that the present invention provides a system for describing directional sound which enables the user to designate, through simple measures, where a sound is to be heard. This approach frees the user from strict rules regarding conventional sound propagation, and provides extremely fine local control over the sound reproduction. At the same time, however, the system requires a relatively simple run-time engine, and is therefore computationally inexpensive.

It will be appreciated by those of ordinary skill in the art that the present invention can be embodied in other specific forms without departing from the spirit or essential characteristics thereof. For example, the principles of the invention have been described in connection with associated visible imagery. In fact, however, visible images are not required. The "scene" presented to a viewer might be totally black, for example, to simulate a dark room or deep space. In such a case, the user's sense of location within the environment is determined solely by the audible sounds that can be heard from each viewpoint, as established in the sound intensity array.

The presently disclosed embodiments are therefore considered in all respects to be illustrative and not restrictive. The scope of the invention is indicated by the appended claims rather than the foregoing description, and all changes that come within the meaning and range of equivalence thereof are intended to be embraced therein.

What is claimed is:

1. A method for producing sounds corresponding to different views in a computer-generated environment, comprising the steps of:
    establishing a visual scene for the environment;
    establishing a viewing area which encompasses at least a portion of said visual scene;
    generating an array of sound intensities corresponding to a sound source associated with said visual scene;
    defining a hearing area from said viewing area which encompasses at least a portion of said array;
    processing the sound intensities contained within the portion of said array that is encompassed by said hearing area to determine an average sound level; and
    reproducing a predetermined sound at said sound level.

2. The method of claim 1 wherein said hearing area comprises multiple areas each of which has a size and location that is determined in accordance with said viewing area.

3. The method of claim 2 wherein said predetermined sound is stereo sound, and said hearing area comprises first and second areas that respectively correspond to left and right channels of the stereo sound.

4. The method of claim 2 wherein said predetermined sound comprises surround sound, and one of said multiple hearing areas is located approximately 180° out of phase relative to said viewing area.

5. The method of claim 1 wherein said processing step includes the step of integrating the sound intensities within the portion of the array encompassed by said hearing area, and dividing the integrated intensities by the area of said hearing area.

6. A method for producing sounds corresponding to different views in a computer-generated environment, comprising the steps of:
    establishing a visual scene for the environment;
    establishing a viewing area which encompasses at least a portion of said visual scene;
    establishing a plurality of sound sources associated with the environment;
    for each established sound source, generating an array of sound intensities;
    defining a hearing area from said viewing area within the environment;
    processing the sound intensities of each sound source within said hearing area to determine an average sound level for each sound source;
    reproducing sound from a sound track associated with each sound source at the sound level determined for that sound source; and
    mixing the reproduced sounds to produce an output sound for the defined hearing area.

7. The method of claim 6 wherein at least one of said sound sources has plural sound tracks associated with it, and further including the step of selecting one of said plural sound tracks in dependence upon the determined sound level for the sound source.

8. The method of claim 6 wherein said processing step includes the step of integrating the sound intensities within the portion of the array encompassed by said hearing area, and dividing the integrated intensities by the area of said hearing area.

9. The method of claim 6 wherein the step of generating an array comprises placing patterns on a projected image of the environment to indicate propagation paths for the respective sounds.

10. The method of claim 9 wherein said patterns comprise colors, and each sound source has a different color associated with it.

11. The method of claim 10 wherein different color intensities within a pattern represent different respective intensities of sound from the associated sound source.

12. A system for producing sounds in a computer-generated virtual environment, comprising:
    means for storing a visual scene for the environment;
    a display which displays a viewing area that encompasses at least a portion of said visual scene;
    means for generating an array of values which describe the intensity of sounds from a sound source for different viewing areas in said environment;
    means for establishing a hearing area which is determined from a viewing area in said environment and designates a portion of said array;

means for processing the intensity values in said designated portion of the array to determine a representative intensity value; and means for reproducing sounds from a stored soundtrack associated with said sound at a volume corresponding to said representative intensity level.

13. The system of claim 12 wherein plural sound sources are associated with said environment, and wherein said generating means generates an intensity value array for each sound source.

14. The system of claim 13 wherein said processing means processes the intensity values in each array separately to determine a representative intensity value for each sound source, and said reproducing means reproduces the sounds from plural soundtracks at respective volumes corresponding to the representative intensity levels.

15. The system of claim 12 wherein said sound source has plural soundtracks associated with it, and further including means for selecting one of said soundtracks.

16. The system of claim 15 wherein said selecting means selects a soundtrack in dependence upon representative intensity value.

17. The system of claim 12 wherein said means for establishing a hearing area comprises means for designating a viewpoint for the environment, and means for calculating the location and size of said hearing area from said viewpoint.

18. The system of claim 17 wherein said calculating means calculates multiple hearing areas for a viewpoint, and said processing means separately processes the intensity values in each of said multiple hearing areas to determine a representative intensity value for each hearing area.

19. The system of claim 12 wherein said representative intensity value comprises the average value of the intensity values encompassed by said hearing area.

\* \* \* \* \*